Patented Aug. 14, 1951

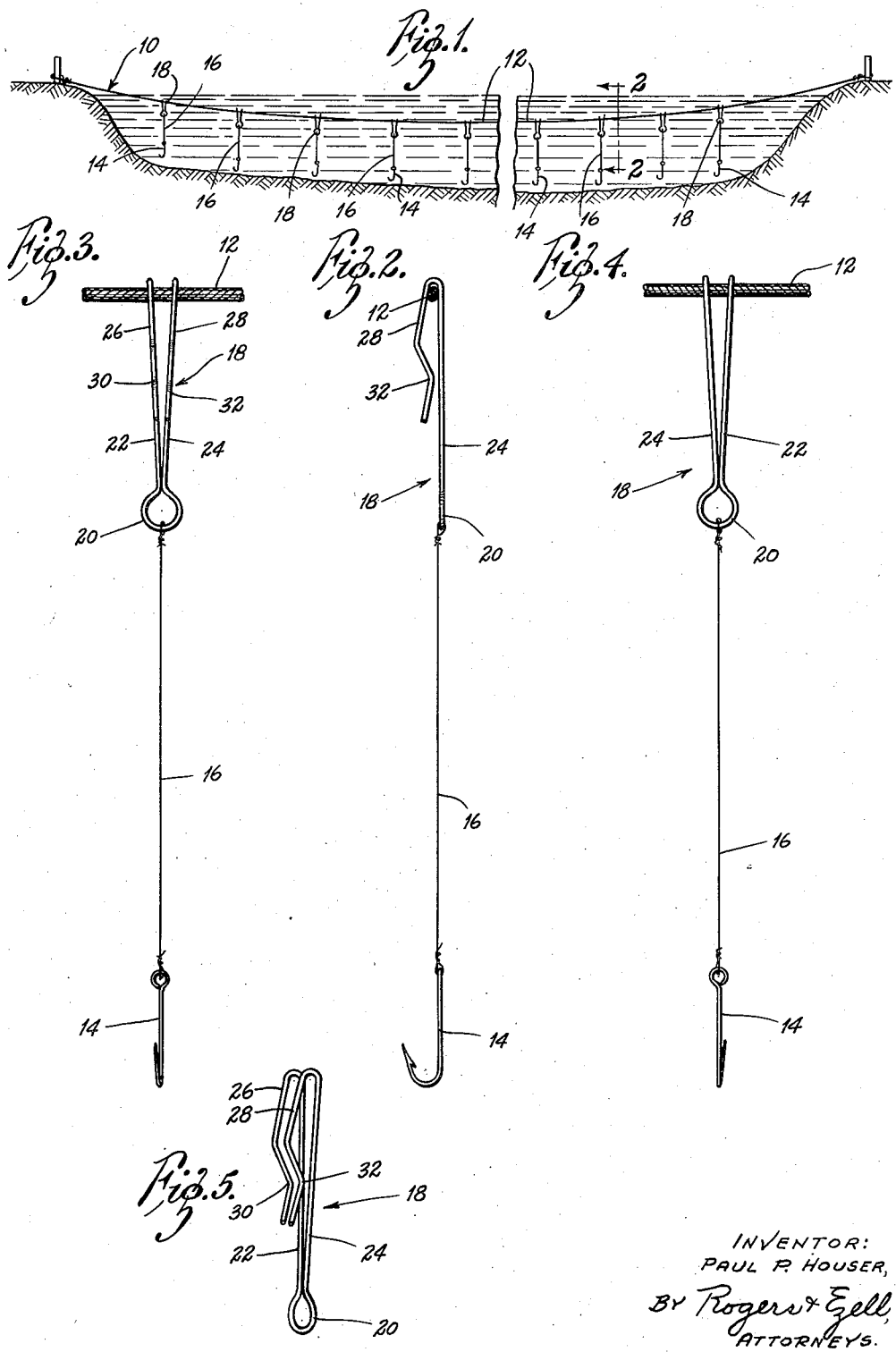

2,564,260

UNITED STATES PATENT OFFICE 2,564,260

HOOK FOR TROTLINES

Paul P. Houser, St. Louis, Mo.

Application July 1, 1948, Serial No. 36,459

1 Claim. (Cl. 24—237)

The present invention relates generally to fishing tackle, and more particularly to a novel for removably fastening the stagings to the main runner line of a trotline.

In the known types of trotlines, it is necessary to tie the stagings, which are short lengths of line carrying a fish hook at one end, to the main runner line or to thread it through a bight formed in the runner line. Securing the staging to the runner line by these known methods is both tedious and time consuming, and removing them preparatory to storage is even more difficult because the lines are wet and the knots have become tightened due to the action of the current and hooked fish pulling on the stagings.

It is a primary object of the present invention, therefore, to provide a novel device for fastening the stagings to the runner line of a trotline whereby they can be quickly and easily attached to and removed.

Another object is to provide a device for fastening the stagings to the runner line of a trotline whereby they will remain in their attached positions and will not slide along the main runner line.

Another object is to provide a device for fastening stagings to the runner line of a trotline which will accommodate main runner lines of various diameters.

Another object is to provide a device for fastening stagings to the runner line of a trotline which is simple in construction and operation and inexpensive to manufacture.

Further objects and advantages of the present invention will be apparent from the following description wherein a preferred embodiment of the present invention is shown, and in which:

Fig. 1 is a vertical cross-sectional view of the bed of a stream showing a trotline stretched between the banks and provided with fastening devices constructed in accordance with the teachings of the present invention;

Fig. 2 is an enlarged side elevational view taken on the line 2—2 in Fig. 1;

Fig. 3 is an elevational view of a staging, a staging fastening device, and a portion of the main runner line as viewed from the left of Fig. 2;

Fig. 4 is an elevational view of a staging, a staging fastening device and a portion of the main runner line, as viewed from the right of Fig. 2; and Fig. 5 is a perspective view of a staging fastening device made in accordance with the teachings of the present invention.

Referring to the figures more particularly by reference numerals, 10 indicates generally a trotline provided with fastening devices made in accordance with the teachings of the present invention. The trotline comprises a main runner line 12 to which is fastened a plurality of stagings, each comprising a hook 14 and a leader 16, the stagings being attached to the runner line at spaced intervals by means of the fastening devices 18.

The fastening devices or clips 18 are constructed of wire-like material which is preferably corrosion resistant and are made by forming the material to the shape shown in Fig. 5. Each fastening device comprises a completely closed ring-like bottom portion 20, a pair of straight shank portions 22 and 24 extending therefrom and diverging outwardly therefrom, and a pair of downwardly extending clip portions 26 and 28 which are provided by bending the upper ends of portions 22 and 24 back upon themselves as shown. The portions 26 and 28 are formed so as to diverge from the bights or bends thus formed at an acute angle with the shanks 22 and 24, they are then bent first inwardly toward the shank portions 22 and 24 and thence outwardly to form the bent portions 30 and 32.

Operation

The main runner line 12 is stretched between the banks of a stream being fished, for example, and the fastening devices 18 with the stagings attached thereto are laid out in the boat preparatory to fastening them to the line 12. As one occupant maneuvers the boat another works the line, pulling a portion of it out of the water and holding it with one hand while attaching the fastening devices 18 with the other hand. When attaching the fastening devices 18 to the line 12, they are grasped with the thumb and first fingers of the hand between the ring-like portion 20 and the clip portions positioned on the main runner line 12 so that the latter is disposed between the shank portions 22 and 24 and the free ends of the clip portions 26 and 28. The fastening device 18 is then pulled downwardly on the line 12 so that the latter forces the bent portions 30 and 32 away from the straight shank portions 22 and 24, thereby permitting the line 12 to pass upwardly toward the bight of the clip and thence to become tightly wedged between the converging shank portions 22 and 24 and the hook-like portions 26 and 28.

The outwardly extending free ends of the bent portions 30 and 32 assist in guiding the line 12 into the bight of the fastening device 18, and the clip portions 26 and 28 converge gradually toward the bight which connects them with the shank portions 22 and 24 so that the line will become wedged between them regardless of its diameter, thereby preventing it from moving along the line. The bights or bends connecting the shank portions with the clip portions may obviously have radii smaller than the smallest diameter of any running line likely to be used, so as to insure that any size running line will become wedged before bottoming in the bight. The divergent spaced shank portions 22 and 24 and the cooperating spaced hook-like portions 26 and 28 prevent the clip 18 from turning and twisting on the line 12. The ring portion 20 being completely closed prevents the staging knot from slipping upwardly along the shank 22 or 24.

In removing the fastening devices 18 from the line 12, they are grasped as described supra and are pushed upwardly away from the line until the latter passes beyond the free ends of the clip portions 30 and 32.

Thus it is apparent that there has been provided a novel fastening device for removably fastening the stagings to the main runner line which is both simple in construction and inexpensive to manufacture, and in which the stagings can be attached to and removed from the main runner line with a minimum of effort by even the most inexperienced fisherman.

It is apparent that the fastening device could also be made with only a single hook-like portion, or that it could be made from flat ribbon-like material.

It is to be understood that the foregoing description and the accompanying drawing have been given only by way of illustration, and that changes and alterations in the present disclosure, which will be readily apparent to one skilled in the art, are contemplated as within the scope of the present invention which is limited only by the claim which follows.

What is claimed is:

A device of the class described constructed of a continuous piece of wire material, comprising a pair of relatively straight shank portions which converge to form a V, a relatively small completely closed attaching ring formed at the apex of the V, the diverged ends of said shank elements being bent back so as to form hook-like line engaging elements each of which end lies in a plane perpendicular to the V formed by said shank portions, each of said bent back portions and its shank portion diverging at an acute angle from the bight connecting them, and said shank portions being of such length as to space said attaching ring from said line engaging elements sufficiently to provide a handle such as may be grasped conveniently between the thumb and forefinger.

PAUL P. HOUSER.

REFERENCES CITED

The following references are of record in the file of this patent:

UNITED STATES PATENTS

| Number | Name | Date |
| --- | --- | --- |
| 417,590 | Schloss | Dec. 17, 1889 |
| 698,571 | Smith | Apr. 29, 1902 |
| 736,606 | Lamb | Aug. 18, 1903 |
| 773,979 | Fevey | Nov. 1, 1904 |
| 885,003 | Beard | Apr. 21, 1908 |
| 1,187,764 | Morden | June 20, 1916 |
| 1,358,815 | Barrell | Nov. 16, 1920 |
| 1,363,401 | Flynn | Dec. 28, 1920 |
| 1,378,890 | Muck | May 24, 1921 |
| 1,459,685 | Nuebling | June 19, 1923 |
| 1,497,710 | Cole | June 17, 1924 |
| 1,531,977 | Ritch et al. | Mar. 31, 1925 |
| 1,809,689 | Graves | June 9, 1931 |
| 2,276,377 | Duffek | Mar. 17, 1942 |